No. 783,036. PATENTED FEB. 21, 1905.
E. E. GOULD.
HORIZONTAL WINDMILL.
APPLICATION FILED OCT. 19, 1904.
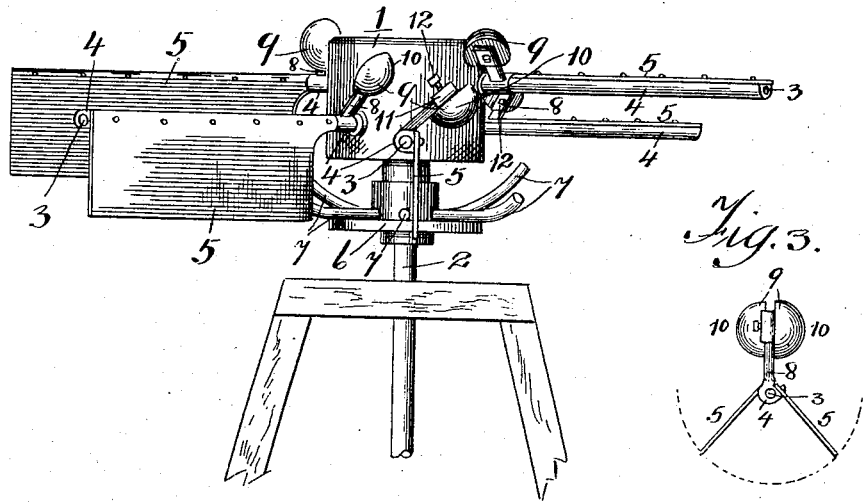
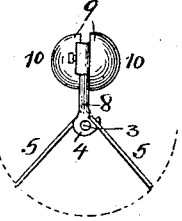
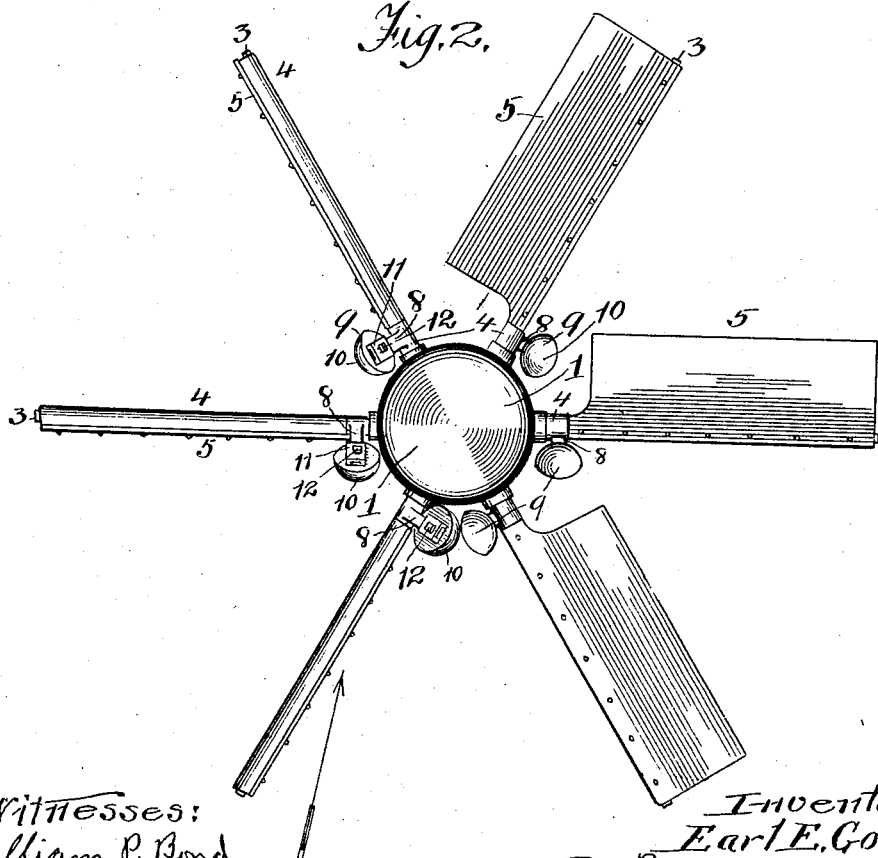

No. 783,036. Patented February 21, 1905.

UNITED STATES PATENT OFFICE.

EARL E. GOULD, OF CHICAGO, ILLINOIS.

HORIZONTAL WINDMILL.

SPECIFICATION forming part of Letters Patent No. 783,036, dated February 21, 1905.

Application filed October 19, 1904. Serial No. 229,143.

*To all whom it may concern:*

Be it known that I, EARL E. GOULD, a citizen of the United States, residing at Chicago, in the county of Cook and State of Illinois, have invented certain new and useful Improvements in Horizontal Windmills, of which the following is a specification.

This invention relates to the class of windmills usually termed "horizontal" windmills, in which the blades are arranged to receive the impact of the wind on their broadside and approach the wind in edgewise relation. The principal difficulty hitherto experienced in the construction of such mills lay in the fact that it required so much wind force to bring the blades into operative position that the resulting efficiency of the wheel was greatly decreased.

The object of the present invention is to provide means for bringing the blades into operative position with but a very slight expenditure of wind-power and maintaining the blades in operative position during their entire period of active efficiency. This arrangement allows practically the entire force of the wind to be expended in revolving the wheel and generating power, thereby rendering the wheel highly efficient and enabling it to perform a greater amount of work than wheels of a similar character hitherto constructed.

The invention consists in the features of construction and combination of parts hereinafter described and claimed.

In the drawings illustrating the invention, Figure 1 is a side elevation of the windmill in operative position; Fig. 2, a top or plan view of the same, showing the wind blowing in the direction of the arrow; and Fig. 3, an end view of one of the rods with the blades normal.

The mill as constructed consists of a hub 1, suitably mounted on a shaft 2, adapted to transmit the power derived from the mill in any suitable manner, and said shaft has passing therethrough in the construction shown a series of three rods 3, which outwardly project from the hub on opposite sides and are rotatably mounted within the hub to allow them to rock or turn back and forth when in use. On the outwardly-projecting ends of the rods are mounted sleeves 4, to which are secured the blades 5, two blades being mounted on each of the three rods in transverse relation to each other. The blades are secured to the sleeves 4 near their upper edges, and the two blades on the same rod are adapted to act in combination with one another, so that when one of the blades is turned to present its broad side to the wind its companion blade will approach the wind in edgewise relation. Below the hub is located a disk or collar 6, having secured thereto a series of abutments 7, one for each of the blades, which abutments are positioned to limit the downward swing of the blades when in acting position. The rods supporting the blades, as shown, are passed through the hub at different degrees of elevation, which arrangement necessitates that the abutments for the blades be outwardly projected at different angles to lie in proper position to limit the movement of the several blades.

In a mill constructed as above specified when in working order the blades on the same shaft in the absence of any wind will counterbalance each other and both lie at an angle of forty-five degrees, since both are of the same weight. If the wind strikes the blades, it will tend to swing down the blades on one end of the shaft into transverse relation to the line of travel of the wind; but it will require a high degree of pressure to do this, for the reason that the farther the operative blade is swung down toward the vertical the greater will be the difficulty of raising the companion blade into a horizontal position, so that it will necessitate a wind of very great pressure to bring each of the working blades into a vertical position, in which the greatest efficiency is secured. It is to overcome this difficulty that each of the sleeves 4 is provided near its inner end with an arm or bar 8, projecting upwardly and forwardly from the blade at an angle of forty-five degrees in the preferred form, and said rod or bar has secured thereto a weight 9, which is preferably outwardly bulged to provide a semispherical ball 10, which outwardly projects on the forward or operative side of the bar 8 and is provided with a sleeve or collar 11, which surrounds the bar and is adjustably secured thereto by means of a set-screw 12, although the bar and weight can be integrally formed, if so desired.

With the weights located and secured as above specified the blades on the same rod when in normal position, as shown in Fig. 3, will project in opposite directions at right angles to each other and at an angle of forty-five degrees to the horizontal, and the weighted arms will project vertically upward in line with each other on opposite sides of the hub. The operation of swinging the blades into operative position will be extremely easy, requiring but a very slight expenditure of wind force to bring the blades from the horizontal position shown on the right-hand side of the figures into the vertical or acting position shown on the left side. As soon as the blades pass a certain point (indicated by the arrow in Fig. 2) and come under the influence of the wind they will be immediately swung into operative position and present their entire acting-surface to the wind during a semirevolution, for the reason that the slightest wind-pressure will be sufficient to swing the blades. Without the counterbalance-weights the blades would be gradually rather than suddenly swung from edgewise to broadside position, assuming the latter position only when receiving the full impact of the winds, so that the blades would only present a fractional part of their entire superficial area to the influence of the wind. As a result of this condition the blades would also gradually be swung into edgewise position when approaching the wind, so that there would be a considerable drag on the non-operative side of the wheel, which would further tend to decrease the efficiency of the wheel as a whole.

By arranging the weights as shown each of the three rods will have secured thereto two weights, which are properly positioned to balance the wheel on opposite sides of the hub, and by upwardly projecting the arms at an angle of forty-five degrees to the plane of the blades both of the weights on a single rod will lie on the same side of the axial center of the rod when the blades are initially thrown out of normal. This arrangement causes both of the weights to exert a counterbalancing pressure and enables the use of smaller counterbalances than would otherwise be necessary. Another advantage in the present arrangement lies in the fact that the operation of the wheel as a whole will be facilitated by the momentum of the wheel, which successively throws up the blades into edgewise position to the wind the instant they approach the wind and feel the broadside force of the wind, which action, combined with the ease of swing or operation of the blade on the opposite end of the rod or shaft, tends to swing the blade into operative position with the expenditure of practically none of the wind-power. In other words, the blades on opposite ends of the same rod or shaft both act simultaneously together, one tending to swing into operative position and the other out of operative position after passing the medial point.

The arms or bars 8 should be of a sufficient length to insure a good leverage and at the same time not interfere with the action of the adjacent blades; but such interference can be easily avoided, for the reason that, as shown, the blades are located at different degrees of elevation, leaving a large space between adjacent blades for the operation of the weights. As shown, the weights are adjustably arranged upon the arms or bars; but such adjustment will not be necessary in cases where the proper size and arrangement of the weights have been previously determined.

It will be seen from the foregoing description that the counterbalance-weights of the present invention serve to give a certain, positive, and instantaneous action to the blades when falling into and rising out of operative position, so that all the blades on the operative side of the wheel present their entire broadside surface to the wind and utilize the wind force to the greatest possible extent, and all of the blades on the non-operative side of the wheel are in edgewise position to the wind, thereby decreasing the friction to a minimum as the blades approach the wind. The weights serve to counterbalance the blades at all periods of angular variation, so that there will be no jolting or jarring as the blades are swung from one position into the other.

The invention is one which is extremely simple and is adapted to be applied to horizontal windmills of different structural formation, and the invention is not limited to the precise manner of mounting the blades or weights heretofore described, since said mechanical features can be varied without departing from the spirit of the invention.

What I regard as new, and desire to secure by Letters Patent, is—

1. In a horizontal windmill, the combination of a hub, a series of rotatably-mounted rods passing through and outwardly projecting on both sides from the hub, a series of blades or wings secured at one edge to the outwardly-projecting portions of the rods, the blades on opposite ends of the same rod being in angular relation to one another and adapted to depend from the rods when in operative position and backwardly project from the rods when approaching the wind, and counterbalance-weights secured to each of the rods on the opposite side of the axial center of one of the blades and adapted to counterbalance the blades, substantially as described.

2. In a horizontal windmill, the combination of a hub, a series of rotatably-mounted rods passing through and outwardly projecting on both sides from the hub, a series of blades or wings secured at one edge to the outwardly-projecting portions of the rods, the blades on opposite ends of the same rod being in angular relation to one another and adapted to depend from the rods when in operative position and backwardly project from the rods when approaching the wind, and a counterbalance-weight for each of the blades on the opposite side of the axial center of the blade, two weights being secured to each rod on opposite sides of the hub, substantially as described.

3. In a horizontal windmill, the combination of a hub, a series of rotatably-mounted rods secured to and outwardly projecting from the hub, a series of blades or wings secured at one edge to the outwardly-projecting portion of the rods, the blades on the same rod being in angular relation to one another and adapted to depend from the rods when in operative position and backwardly project from the rods when approaching the wind, and a counterbalance-weight for each of the blades secured to the rod on the opposite side of the axial center of the blade and at an angle to the plane of the blade, the two weights on the same rod being held in line with one another, substantially as described.

4. In a horizontal windmill, the combination of a hub, a series of rotatably-mounted rods secured to and outwardly projecting from the hub, a series of blades or wings secured at one edge to the outwardly-projecting portions of the rods, the blades on the same rod being in angular relation to one another and adapted to depend from the rods when in operative position and backwardly project from the rods when approaching the wind, a series of arms, one for each blade, secured to the rods and extending at an angle to the plane of the blade and on the opposite side of the axial center thereof, the two arms on the same rod being in line with one another, and a series of counterbalance-weights secured to the arms, substantially as described.

5. In a horizontal windmill, the combination of a hub, a series of rotatably-mounted rods secured to and outwardly projecting from the hub, a series of blades or wings secured at one edge to the outwardly-projecting portions of the rods, the blades on the same rod being in angular relation to one another and adapted to depend from the rods when in operative position and backwardly project from the rods when approaching the wind, a series of arms, one for each blade, secured to the rods and extending at an angle to the plane of the blade and on the opposite side of the axial center thereof, the two arms on the same rod being in line with one another, a series of counterbalance-weights secured to the arms, and a series of radially-arranged stops secured to the hub and adapted to be contacted by the blades when swung into operative position, substantially as described.

6. In a horizontal windmill, the combination of a hub, a series of rotatably-mounted rods passing transversely through the hub and outwardly projecting on opposite sides thereof, a series of blades secured at one edge to the outwardly-projecting ends of the rods, the blades on the same rod being in angular relation to one another, a series of arms one for each blade secured to the rods and extending at an angle of forty-five degrees to the plane of the blade and on the opposite side of the axial center thereof, the two arms on the same rod being in line with one another, and a series of counterbalance-weights secured to the arms, substantially as described.

EARL E. GOULD.

Witnesses:
SAMUEL W. BANNING,
PIERSON W. BANNING.